(No Model.) 2 Sheets—Sheet 1.
S. ARNAUD.
MEAT CRUSHER, &c.
No. 472,973. Patented Apr. 19, 1892.
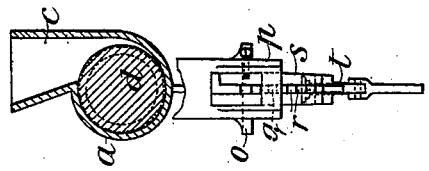
Fig. 2.
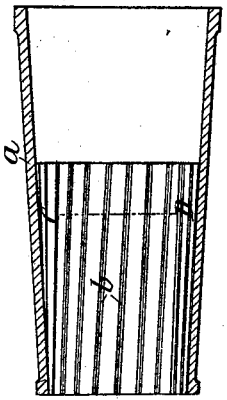
Fig. 3.
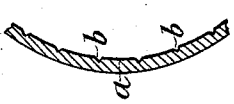
Fig. 5.
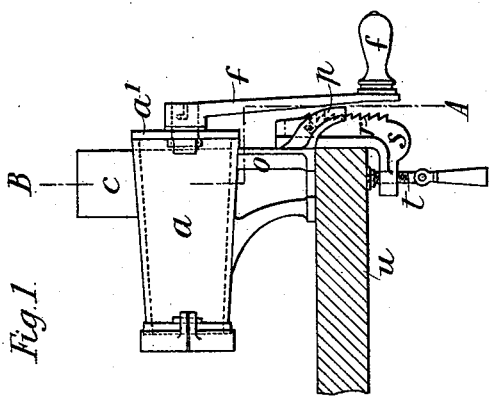
Fig. 1.
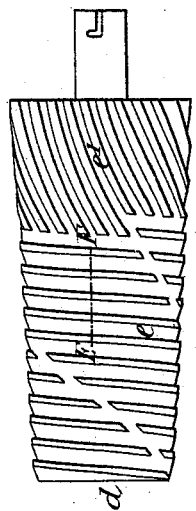
Fig. 4.
Fig. 6.
Witnesses.
Jesse Kingsbery.
G. A. Vanbeuschmidt
Inventor.
Samuel Arnaud.
By Whitaker & Prevost, attys.

(No Model.) 2 Sheets—Sheet 2.

S. ARNAUD.
MEAT CRUSHER, &c.

No. 472,973. Patented Apr. 19, 1892.

Witnesses. Inventor
Jesse Kingsbery Samuel Arnaud
G A Vauberschmitt By Whitaker Prevost attys.

UNITED STATES PATENT OFFICE.

SAMUEL ARNAUD, OF MAIDENHEAD, ENGLAND.

MEAT-CRUSHER, &c.

SPECIFICATION forming part of Letters Patent No. 472,973, dated April 19, 1892.

Application filed January 29, 1892. Serial No. 419,726. (No model.) Patented in England July 28, 1888, No. 10,959.

*To all whom it may concern:*

Be it known that I, SAMUEL ARNAUD, a subject of the Queen of Great Britain, residing at Maidenhead, Berks, England, have invented a new and useful Improved Machine for Crushing or Grinding Meat and for Similar Purposes, (partly covered by a patent granted to me in Great Britain, No. 10,959, dated July 28, 1888,) of which the following is a specification.

My invention relates to an improved machine for crushing and grinding meat and other fibrous materials to reduce them to the pasty or pulpy condition frequently required for cooking purposes, and is designed for use in lieu of a pestle and mortar hitherto used.

My improved machine comprises a hollow casing having the shape of a cylinder or of the frustum of a cone, the internal surface of which is longitudinally grooved or otherwise roughened. At or near one end of this casing is a hopper or opening for the introduction of the material to be ground, and at the other end is an opening for the discharge of the ground material. Within this casing is a roller having a grooved or roughened surface and adapted to rotate in close contact with the internal surface of the said casing, so that any material between the casing and the roller is operated upon to reduce it to the required condition. The grinding or crushing roller is supported in a suitable bearing or bearings in or upon the ends of the casing and the grooves upon the roller and the interior of the casing are formed spirally in such a manner as to cause the gradual travel of the material through the machine. To the end of the grinding-roller is attached a knife or scraper having upon it a series of pins which serve to entangle any uncrushed fibers or sinews, and thus prevent them from being delivered with the crushed meat. I arrange at the discharge end of the casing a grid or perforated plate through which the crushed meat is forced.

To enable my invention to be fully understood, I will describe how it can be carried into practice by reference to the accompanying drawings, in which—

Figure 7:
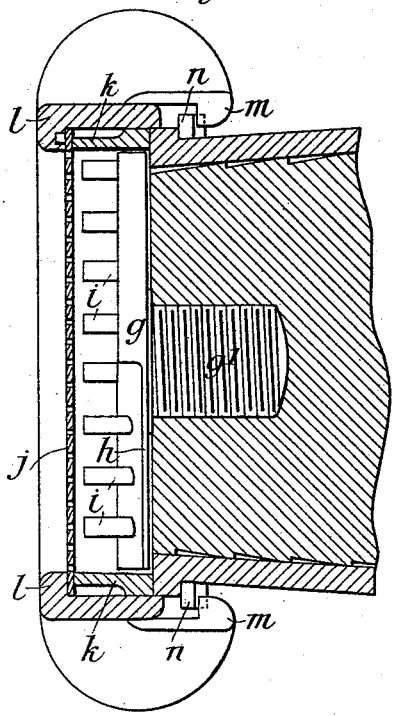
Figure 9:
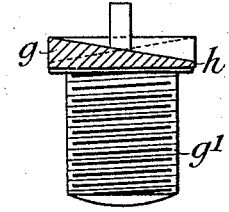
Figure 8:
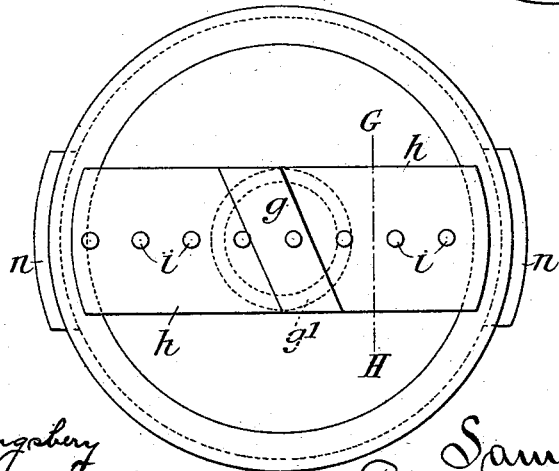

Figure 1 is a side elevation of a machine for crushing or grinding meat and for similar purposes constructed according to my invention, and Fig. 2 is a section of the same on the line A B of Fig. 1. Fig. 3 is a longitudinal section of the hollow casing, and Fig. 4 is a side elevation of the roller, both these latter figures being drawn to larger scale. Fig. 5 is a section of part of the casing on the line C D of Fig. 3, and Fig. 6 is a section of part of the roller on the line E F of Fig. 4, the said Figs. 5 and 6 being drawn to a still larger scale. Fig. 7 is a sectional view, drawn to an enlarged scale, of one end of the pulping cylinder and roller, showing the scraper and pins for catching the fibers or sinews; and Fig. 8 is an end view of the same. Fig. 9 is a section on the line G H, Fig. 8.

Similar letters in all the figures indicate similar parts.

*a* is the hollow casing, which is slightly conical, and *b b* are the grooves formed therein, the said grooves running in a longitudinal and slightly spiral direction, as clearly shown in Fig. 3, and being preferably shaped, as shown in Fig. 5.

*c* is the hopper at one end of the casing for the introduction of the material to be ground.

*d* is the grinding-roller, which is also conical to correspond with the casing and adapted to rotate in close contact with the internal surface of the said casing *a* in a bearing formed in a plate *a'*, fixed to one end of the casing, as represented in Fig. 1.

*e* and *e'* are the grooves in the roller *d*. The grooves *e* are made of the form shown clearly in Fig. 6, and instead of being continuous are preferably interrupted, as indicated in Fig. 4. By making the grooves *e* of this shape and causing the roller to act against the longitudinal grooves *b* of the casing I produce a grinding or pulping action upon the material fed thereto, and in this respect my improved machine materially differs from a mincing-machine which merely chops or cuts up the material into very small pieces. The grooves *e'* at the large end of the cylinder are arranged, as shown in Fig. 4, so as to quickly transfer the material to be crushed from the hopper to the grooves *e*.

*f* is the handle for rotating the grinding-roller.

*g* is the blade or scraper which I attach to the small end of the roller *d*, (for instance, by means of the screw-shank $g'$,) the said scraper being beveled upon its opposite sides, so as to form edges $h\ h$.

$i\ i$ are the pins secured to the blade or scraper $g$ and serving to catch the sinews, the pins upon one side of the center of the blade being arranged to pass through the material undisturbed by the pins on the other side of the center of the said blade.

$j$ is the grid or perforated plate at the discharge end of the casing through which the crushed or ground material is forced and serving to arrest any sinews which may have escaped the pins $i\ i$. This grid or plate $j$ is made removable, being held firmly against the packing-ring $k$ by means of the clamping-ring $l$, having claws $m\ m$ engaging with inclined ribs $n\ n$ upon the casing.

The casing $a$ is cast with a foot $o$, Figs. 1 and 2, having a projection $p$ formed with the teeth $q$, engaging with any part of a series of teeth $r$, formed on a clamping-bracket $s$, of which $t$ represents the clamping-screw. This arrangement allows of the machine being readily fixed to a table $u$, Fig. 1, or the like, it being only necessary for this purpose to place the machine with the foot $o$ at the edge of the table $u$, and then to place the clamp $s$ against the edge and under side of the table, when the teeth $q$ will be located in some of the teeth $r$. By then giving one or two turns to the clamping-screw $t$ the machine will be securely fixed to the table.

Having now particularly described and ascertained the nature of my said invention and in what manner the same is to be performed, I declare that what I claim is—

1. A machine for crushing and grinding meat and for similar purposes, comprising a casing formed with substantially longitudinal grooves on its interior and provided with a receiving aperture or hopper, and a roller having a series of substantially longitudinal grooves adjacent to said hopper and having other portions provided with a series of grooves extending around said roller transversely adjacent to the longitudinal grooves of the casing, substantially as described.

2. A machine for crushing and grinding meat and for similar purposes, comprising a casing formed with substantially longitudinal grooves on its interior and provided with a receiving-hopper, and a roller having a series of substantially longitudinal grooves adjacent to the hopper and having other portions of its surface provided with grooves extending around said roller transversely, said grooves being interrupted at intervals, substantially as described.

3. A machine for crushing or grinding meat and for other purposes, comprising a casing having a grooved interior, a grooved roller adapted to be rotated therein, said casing having an enlarged portion adjacent to the end of said roller, and a knife secured to said roller extending transversely beyond the periphery of the same and engaging the enlarged portion of the cylinder, substantially as described.

4. A machine for crushing or grinding meat and for similar purposes, comprising a casing formed with substantially longitudinal grooves, a roller adapted to be rotated therein and having grooves formed, as shown, a blade or scraper carrying a series of pins secured to the said roller, and a grid or perforated plate clamped over the discharge end of the casing, all substantially as and for the purposes described.

SAMUEL ARNAUD.

Witnesses:
A. CAMPBELL,
G. FLETCHER.